United States Patent Office 3,125,536
Patented Mar. 17, 1964

3,125,536
VINYL PRODUCTS AND PROCESS
William J. O'Brien, New Haven, Conn., assignor to The Seamless Rubber Company, New Haven, Conn., a corporation of Connecticut
No Drawing. Filed Jan. 8, 1959, Ser. No. 785,564
4 Claims. (Cl. 252—301.3)

This invention relates to novel fluorescent vinyl resin products, in particular to products made from vinyl resin plastisols, and to the method of producing such products.

Attempts have been made in the past to apply fluorescent dyes to various vinyl resin plastisol and organosol base compounds in an attenyst to prepare fluorescent products therefrom. It is a well known expedient in the art to use fluorescent varnish or paints to cover a vinyl resin base material. A fluorescent finish applied in this manner however is merely a thin film or coating and is not durable. It almost immediately fades and scuffs when the plastic article is put in use.

Efforts to incorporate the fluorescent dyes with the vinyl resin compounds were not satisfactory since the high temperatures needed to fuse the resins destroyed the fluorescent brilliance of the fluorescent colors.

A further difficulty encountered was the necessity of using a relatively large amount of fluorescent dye to obtain a satisfactory brilliance with the transparent or clear vinyl resin products. Also, ordinary pigmentation was known to obscure or mask the fluorescent color.

U.S. Patent No. 2,809,954 discloses the preparation of fluorescent colored pigments which are capable of withstanding the high fusion temperatures necessary to fuse the vinyl plastisol and organosol compounds. These fluorescent colored pigments are prepared by incorporating a fluorescent dye with a thermoplastic resin which is then finely powdered to form a resin pigment. This resin pigment material can be incorporated into vinyl plastisols and organosols to give the final product a fluorescent color.

Even with these fluorescent resin pigments however it was not possible to get final products which had a brilliant, highly fluorescent color.

Accordingly, an object of the present invention is to provide articles made from vinyl plastisols and organosols, and in particular polyvinyl chloride plastisols, having a brilliant fluorescent sheen and tone.

Another object is to provide a process for preparing brilliant fluorescent colored vinyl resin products.

A further object is to minimize the amounts of fluorescent pigment required to produce a brilliant fluorescent product from a vinyl resin plastisol.

It has been discovered that if from about 2% to about 6%, preferably 4%, of titanium dioxide, based on the weight of the vinyl resin, is added to a vinyl resin plastisol or organosol composition containing a fluorescent resin pigment, the brilliance of the color of the finished article is unexpectedly and markedly improved. It has further been discovered that the use of titanium dioxide, in the proportions set forth above, eliminates the necessity of using large amounts of the fluorescent pigment when a completely transparent vinyl plastisol compound is used.

These improved results have been noted in a variety of products made from vinyl resin plastisols and organosols. Illustrative of such products are fluorescent vinyl tapes, tubes, decals, raincoats and athletic equipment such as basketballs, footballs, etc.

The titanium dioxide can be added directly to the vinyl resin plastisol composition, but is added preferably in the form of a dispersion containing titanium oxide and a plasticizer, such as dioctyl phthalate. These can be varying proportions of titanium dioxide in the dispersion but it is preferred to use a dispersion of two parts of titanium dioxide in one part of plasticizer. While the dispersion can be added to the vinyl plastisol composition at various stages it it preferred to add it thereto after the addition of the powdered fluorescent resin pigment.

All fluorescent resin pigments prepared in the manner set forth in U.S. Patent No. 2,809,954 can be used and their fluorescent brilliance is improved by the addition of the titanium dioxide.

Suitable vinyl plastisols, and in particular polyvinyl chloride plastisols, are those which can be used for injection molding, slush casting, extrusion, wall paints and resin coatings. A variety of plasticizing agents and heat stabilizing agents can be used to prepare the vinyl resin plastisols. The types selected depend upon the type of vinyl resin and use to be made of the vinyl resin plastisol. These plasticizers and stabilizers are all well known.

The following examples will illustrate the invention.

*Example I*

|  | Lbs. | Ozs. |
|---|---|---|
| Finer particle dispersible Polyvinyl Chloride Resin | 21 |  |
| Larger particle dispersible Polyvinyl Chloride Resin | 9 |  |
| Dioctyl phthalate | 16 | 8 |
| Dioctyl azelate | 14 | 8 |
| Paraplex G-62 [1] | 1 | 8 |
| Vanstay R [2] |  | 13 |
| Vanstay Z [3] |  | 5 |
| A dispersion consisting of 67% Titanium dioxide and 33% dioctyl phthalate | 1 | 3 |
| Saturn Yellow A-17 [4] | 12 |  |
|  | 76 | 13 |

[1] The Paraplex resin plasticizers are polyester alkyd resin plasticizers for vinyl compounds for low pressure molding; e.g., an ester of glycerol and phthalic acid dissolved in toluene.
[2] A cadmium and barium 2-ethyl hexoate salt with an organo phosphite ingredient and an antioxidant of the phenolic type, used as a heat stabilizer for calendering and extruding vinyl plastisols.
[3] A zinc 2-ethyl hexoate salt with an organo phosphite ingredient and an antioxidant of the phenolic type, used as a heat stabilizer for polyvinyl compounds.
[4] A yellow fluorescent dye embedded in a synthetic resin and prepared in the manner set forth in U.S. Patent No. 2,809,954.

The polyvinyl chloride resin was blended with the plasticizers, stabilizers and pigment. The titanium dioxide dispersion was then added to the mixture. After the batch having the above formula was prepared it was molded and cured to form fluorescent colored basketballs having a brilliant yellow fluorescent color. The brilliant yellow color was durable and did not scuff and fade despite the prolonged and heavy use of the basketball.

*Example II*

In order to illustrate the fluorescent brilliance or distinctiveness of the fluorescent color that was obtained by the addition of the titanium dioxide to the vinyl plastisol compounds the following test was made.

|  | Lbs. | Ozs. |
|---|---|---|
| Finer particle dispersible Polyvinyl Chloride Resin | 24 |  |
| Larger particle dispersible Polyvinyl Chloride Resin | 6 |  |
| Whiting | 3 |  |
| Dioctyl phthalate | 13 | 8 |
| Dioctyl azelate | 13 | 8 |
| Paraplex G-62 | 1 | 8 |
| Vanstay R |  | 14 |
| Vanstay Z |  | 4 |
| A dispersion consisting of 67% Titanium dioxide and 33% dioctyl phthalate | 2 | 8 |
| Lead chromate yellow pigment (non-fluorescent color) (67% pigment in 33% dioctyl phthalate) | 2 | 8 |
|  | 67 | 10 |

A sample swatch "A" was prepared from the above formulation by adding the titanium dioxide and dioctyl phthalate dispersion to the polyvinyl chloride resin after all the other ingredients had been added thereto. The mixed formulation was then calendered and fused to form a swatch of yellow fluorescent colored polyvinyl chloride resin. Swatch "B" formulated according to Example I was a yellow vinyl swatch without titanium dioxide but with the fluorescent resin pigment and swatch "C" was formulated according to Example I.

The reflectance value of each of the swatches was measured with a Photo-Volt Photo Electric-Reflection Meter, Model 610. The results were as follows:

| Composition: | Reflectance value |
|---|---|
| (A) Yellow vinyl with regular non-fluorescent pigment and titanium dioxide | 41 |
| (B) Yellow vinyl with fluorescent resin pigment, but without titanium dioxide | 50 |
| (C) Yellow vinyl with fluorescent resin pigment and titanium dioxide dispersion | 62.5 |

For purposes of comparison a white shiny surface gives a reflectance value of 100; hence the higher reflectance value indicates a brighter reflectant surface.

From the foregoing it can be seen that the fluorescent vinyl swatch having incorporated therein titanium dioxide has a distinctive fluorescent brilliance not found in compounds using the same pigment without any titanium dioxide. The same improvement in brilliance was obtained when the invention was applied to marking tapes, decals, raincoats, athletic equipment and other such articles.

It is to be understood, as noted above, that changes in variations may be made without departing from the spirit and scope of the invention as defined in the appended claims.

I claim:

1. An article having a brilliant fluorescent color consisting essentially of a vinyl resin base, a fluorescent resin pigment distributed uniformly therethrough, and titanium dioxide also distributed uniformly therethrough and present in an amount equal to from about 2% to about 6% by weight of the vinyl resin; said article having a more brilliant fluorescent color than in the absence of titanium dioxide.

2. A process for the preparation of a vinyl resin article having a brilliant fluorescent color comprising the steps of mixing together a vinyl resin base and a fluorescent pigment, and then adding to said mixture from about 2% to about 6% of titanium dioxide, based on the weight of the vinyl resin; said article having a more brilliant fluorescent color than in the absence of titanium dioxide.

3. A process for the preparation of a vinyl resin article having a brilliant fluorescent color comprising the steps of mixing together a vinyl resin base and a fluorescent resin pigment, and incorporating in said mixture a dispersion of titanium dioxide and a plasticizer, the titanium dioxide being added in an amount equal to from about 2% to about 6% by weight of the vinyl resin, the ratio of titanium dioxide to plasticizer in said dispersion being about 2:1; said article having a more brilliant fluorescent color than in the absence of titanium dioxide.

4. An article having a brilliant fluorescent color consisting essentially of a vinyl resin base, a fluorescent resin pigment distributed uniformly therethrough, and titanium dioxide also distributed uniformly therethrough and present in an amount equal to about 4% by weight of the vinyl resin; said article having a more brilliant fluorescent color than in the absence of titanium dioxide.

References Cited in the file of this patent

UNITED STATES PATENTS

| 2,650,169 | Goldstein | Aug. 25, 1953 |
| 2,809,954 | Kazenas | Oct. 15, 1957 |
| 2,938,873 | Kazenas | May 31, 1960 |

FOREIGN PATENTS

| 608,725 | Great Britain | Sept. 20, 1948 |